United States Patent
Scheffler et al.

[11] 3,744,933
[45] July 10, 1973

[54] ELECTROMAGNETIC CONVEYING TROUGH

[75] Inventors: Friedrich Scheffler, Remscheid; Axel von Starck, Remscheid-Luttringhausen, both of Germany

[73] Assignee: AEG-Elotherm GmbH, Remscheid-Hasten, Germany

[22] Filed: Aug. 31, 1971

[21] Appl. No.: 176,608

[30] Foreign Application Priority Data
Nov. 9, 1970 Germany ................ P 20 55 004.3

[52] U.S. Cl. ................... 417/50, 310/11, 417/53
[51] Int. Cl. .................... H02k 45/00, H02n 4/20
[58] Field of Search ............... 417/50, 53; 310/11, 310/13

[56] References Cited
UNITED STATES PATENTS

| 2,698,127 | 12/1954 | Bowlus | 310/11 |
| 2,920,571 | 1/1960 | Fenemore | 417/50 |
| 2,966,858 | 1/1961 | Peters | 417/50 |
| 3,005,116 | 10/1961 | Reece | 417/50 |
| 3,093,569 | 6/1963 | Post | 310/11 |
| 3,478,234 | 11/1969 | Prem | 310/11 |
| 3,554,670 | 1/1971 | von Starck | 417/50 |
| 3,612,720 | 10/1971 | von Starck | 417/50 |
| 3,621,311 | 11/1971 | von Starck | 310/13 |

FOREIGN PATENTS OR APPLICATIONS

| 880,454 | 10/1961 | Great Britain | 417/50 |
| 225,020 | 2/1968 | U.S.S.R. | 417/50 |

OTHER PUBLICATIONS
R. Panholzer, "Electromagnetic Pumps," Feb. 63, Electrical Engineering, p. 128–135.

*Primary Examiner*—William L. Freeh
*Assistant Examiner*—John T. Winburn
*Attorney*—Cushman, Darby & Cushman

[57] ABSTRACT

An electromagnetic conveyor of the type having an upwardly sloping trough body, and a travelling field inductor disposed adjacent the body for generating a travelling electromagnetic field to propel liquid metal up the trough body. The inductor is disposed so that the strength of the field at a surface of the body bounding the liquid metal increases along the trough length. In one embodiment, a refractory lining is disposed between the bounding surface and the inductor such that its thickness, and the distance between the bounding surface and inductor, decreases along the length of the trough body.

12 Claims, 3 Drawing Figures

Patented July 10, 1973 3,744,933

Inventors:
FRIEDRICH SCHEFFLER
AXEL VON STARCK
BY Cushman, Darby & Cushman
ATTORNEYS

ELECTROMAGNETIC CONVEYING TROUGH

The invention relates to an electromagnetic conveying trough, comprising an upwardly sloping trough body up which the liquid metal that is to be conveyed is driven against the force of gravity by an electromagnetic travelling field, and a travelling field inductor mounted adjacent the trough body which causes the conveyance.

The flow of metal thus produced in the body of the trough may have a rectangular cross section, of which the mean dimension in one direction is large in relation to its mean dimension in the direction normal thereto, the travelling field inductor being so disposed in relation to the body of the trough so that the effective component of the travelling field is approximately normal to the major dimension of the cross section of the flowing metal.

Electromagnetic conveying troughs of this type are used with advantage, for instance, in automated foundries where they primarily serve for delivering prescribed volumes of metal. Two conveying troughs that are suitable for delivering prescribed quantities of metal, for instance for casting exactly predetermined quantities of metal, are described in our German Pat. specifications Nos. 1,286,701 and 1,291,061. In these prior art conveying troughs, the travelling field inductor is located below the body of the trough so that the effective field component is perpendicular to the floor of the trough up which the liquid metal is driven in a layer that is thin in relation to the internal width of the trough.

For achieving the highest possible conveying efficiency it was hitherto the aim — disregarding the conditions existing at the trough ends — to keep the mean strength of the travelling field and the driving force applied to the flowing metal as constant as possible. Fluctuations of the driving force, usually due to variations in the thickness of the trough refractory lining along the length of the trough, which are difficult to avoid, give rise to eddies in the pattern of metal flow. These eddies consume a considerable amount of energy and reduce the efficiency of the trough.

It is therefore the object of the present invention to provide an electromagnetic conveying trough in which simple means are employed to suppress the formation of such eddies. In the conveying trough according to the invention this object is achieved in that the strength of the travelling field at the bounding surface of the flowing metal facing the travelling field inductor increases either continuously or stepwise in the direction of flow, at least along the major part of the length of the trough. In a preferred embodiment of the invention this result is produced in that the distance of the active surface of the travelling field inductor from the flowing metal continuously decreases in the direction of flow. This decrease in distance can be achieved by arranging for the thickness of the refractory lining of the body of the trough between the active surface of the travelling field inductor and the flowing metal to continuously decrease.

According to another aspect of the invention the strength of the travelling field at the active surface of the travelling field inductor may be arranged to increase continuously or in steps at least along the major part of the length of the trough.

The invention will be hereinafter more particularly described with reference to embodiments shown in the drawings.

Figure 1:
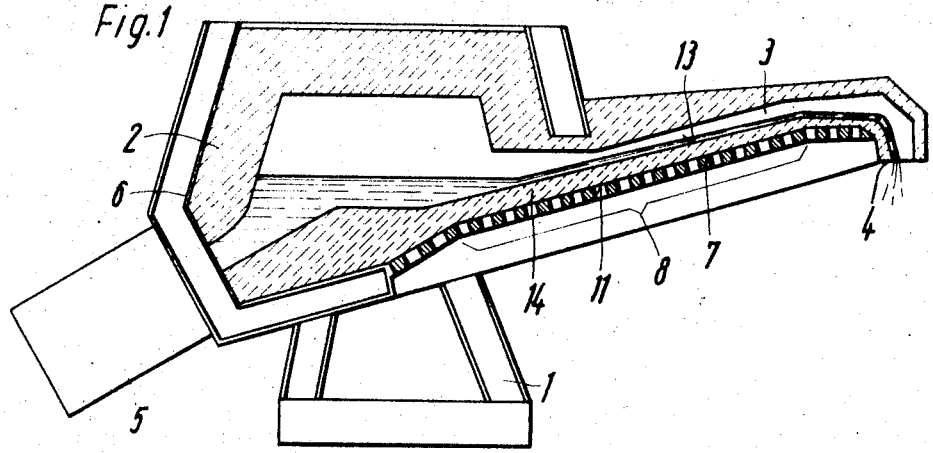
FIG. 1 is a holding furnace combined with a conveying trough, shown in a schematic longitudinal section.

In FIG. 1, furnace vessel 2 rests on a stand 1 and conventionally extends on one side into the upwardly sloping body 3 of the electromagnetic conveying trough which terminates in a pouring spout 4. On the side of the furnace vessel 2 remote from the conveying trough there is fitted to the bottom of the vessel an inductive heating channel 5 for heating the metal charge 6 which is contained in furnace 2. Below the body 3 of the conveying trough is a travelling field inductor 7 which generates a field of substantially constant average strength along the major part 8 of its length.

Figure 2:
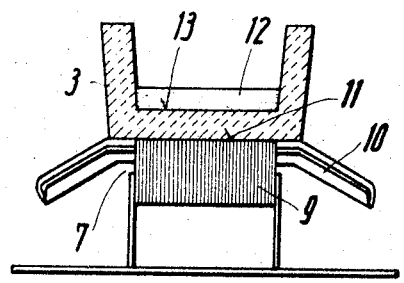
FIG. 2 is a schematic fragmentary cross-section of FIG. 1.

As will be understood from the schematic fragmentary cross section in FIG. 2, the travelling field inductor 7 consists of a slotted laminated sheet metal core 9 which in its slots contains the inductor windings 10. The active surface 11 of the travelling field inductor 7 adjoins the refractory body 3 of the trough proper in which — by virtue of the effect of the travelling field — the liquid metal is driven up the slope in open flow 12, the depth of this flowing layer 12 being small in relation to the width of the floor of the trough.

In order to ensure that, along the length 8 of the inductor 7, the strength of the travelling field, at the boundary 13 of the flowing metal 12 facing the inductor 7, steadily increases in the direction of flow, the body 3 of the trough is so shaped that the thickness of the refractory lining 14 of the body 3 of the trough, and hence the distance between the active surface 11 of the travelling field inductor 7 and the stream 12 of flowing metal, becomes steadily less.

In another advantageous modification of the proposed conveying trough the travelling field inductor is so designed — for instance by virtue of the spacing of the slots steadily decreasing in the direction of flow or the inductor being subdivided and the individual sections of the inductor fed with power at different rates — that the mean field strength at the active inductor surface increases in steps or continuously at least in the middle region of the inductor. This feature may with advantage also be combined with the proposed feature of the preceding embodiment.

Figure 3:
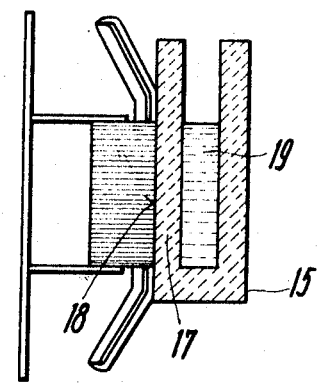
FIG. 3 is a schematic cross-section of another embodiment of this invention.

Furthermore, the present invention may with advantage be applied to conveying troughs in which the travelling field inductor is mounted on one side of or above the body of the trough. For example, FIG. 3 schematically in cross section shows the body 15 of a conveying trough associated with a travelling field inductor disposed on one side of the trough. The thickness of the refractory lining 17 between the active inductor surface 18 and the flowing metal 19 in the body of the trough continuously decreases, at least in the centre portion of the trough in the direction of flow, and in the contemplated region of the inductor — in a manner analogous to that in the contemplated region of the inductor — in a manner analogous to that in the embodiments according to FIGS. 1 and 2 — this causes a corresponding increase in the driving force in the direction of metal flow.

Many changes and modifications in the above embodiments of the invention can of course be made without departure from the scope of the invention. Accordingly, that scope is intended to be limited only by the scope of the appended claims.

We claim:

1. A method of operating an electromagnetic conveying trough of the type having an upwardly sloping trough body and a travelling field inductor disposed adjacent said body for generating an electromagnetic travelling field to cause liquid metal to move up said trough body in an open flow comprising the steps of:
disposing said inductor with respect to said body so that, when an operating signal is applied to said inductor, the strength of the field at the surface of the body bounding the liquid metal and adjacent the inductor increases along at least part of the trough length in the direction of flow and
applying said appropriate signal.

2. A method as in claim 1 wherein said step of disposing includes the step of mounting said inductor adjacent said body surface such that the distance between the body surface and inductor decreases along the trough length in the direction of flow.

3. A method as in claim 2 including the further step of disposing a refractor lining between said inductor and said body.

4. A method as in claim 1 wherein said step of disposing includes the step of mounting said inductor below said trough.

5. A method as in claim 1 wherein said step of disposing includes the step of mounting said inductor beside said trough.

6. An electromagnetic conveying trough comprising:
an upwardly sloping trough body and
a travelling field inductor for generating an electromagnetic travelling field which causes liquid metal to move up said trough body in an open flow and mounted adjacent a surface of said body bounding liquid metal flowing up said conveyor so that the strength of the travelling field at said bounding surface increases in the direction of flow at least along a portion of the body length.

7. An electromagnetic conveyor as in claim 6 including a refractory lining between said body and inductor having a decreasing thickness along the trough length so that the distance between said bounding surface and said inductor decreases along the length of said trough body in the direction of flow.

8. A method of operating an electromagnetic conveying trough of the type having an upwardly sloping trough body and a travelling field inductor disposed adjacent said body for generating an electromagnetic travelling field to cause liquid metal to move up said body in open flow comprising generating a travelling field at a surface of the body bounding the liquid metal having a strength which increases along at least part of the trough length in the direction of flow.

9. In an electromagnetic conveying trough comprising an upwardly sloping body of a trough up which the metal that is to be conveyed is driven in an open flow against the force of gravity, the cross section of the metal flowing in the trough having a mean dimension in one direction that is large in relation to the direction normal thereto, and a linear polyphase travelling field inductor generating an electromagnetic field travelling in conveying direction and having an active component that is at least approximately normal to the said major dimension of the cross section of the flowing metal, the improvement wherein the strength of the travelling field at a bounding surface of the flowing metal facing the travelling field inductor increases in the direction of flow, at least along the major part of the length of the trough.

10. In a conveying trough as in claim 9, the further improvement wherein the distance of the active surface of the travelling field inductor from the flowing metal continuously decreases in the direction of flow, at least along the major part of the length of the trough.

11. In a conveying trough as in claim 10, the further improvement wherein a refractory lining is disposed between the bounding surface and the inductor and the thickness of the refractory lining between the active surface of the travelling field inductor and the flowing metal continuously decreases along the major part of the length of the trough.

12. In a conveying trough according to claim 9 the further improvement wherein the strength of the travelling field at the active surface of the travelling field inductor increases in the direction of flow at least along the major part of the length of the trough.

* * * * *